US012741573B2

(12) United States Patent
Yasuda et al.

(10) Patent No.: US 12,741,573 B2
(45) Date of Patent: Sep. 22, 2026

(54) VEHICLE SEAT

(71) Applicants: NHK SPRING CO., LTD., Yokohama (JP); SUBARU CORPORATION, Tokyo (JP)

(72) Inventors: Kenzo Yasuda, Yokohama (JP); Kazuhiro Toyoshima, Yokohama (JP); Yosuke Ishiyama, Tokyo (JP); Masato Fukushima, Tokyo (JP); Takahide Takeuchi, Tokyo (JP); Kento Koshiishi, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 120 days.

(21) Appl. No.: 18/783,187

(22) Filed: Jul. 24, 2024

(65) Prior Publication Data

US 2025/0074273 A1 Mar. 6, 2025

(30) Foreign Application Priority Data

Aug. 30, 2023 (JP) ................................ 2023-140573

(51) Int. Cl.

*B60N 2/02* (2006.01)
*A47C 7/74* (2006.01)
*B60N 2/56* (2006.01)

(52) U.S. Cl.

CPC ............ *B60N 2/5642* (2013.01); *A47C 7/742* (2013.01); *B60N 2/0284* (2013.01); *B60N 2/5621* (2013.01)

(58) Field of Classification Search

CPC ... B60N 2/0284; B60N 2/5621; B60N 2/5642
See application file for complete search history.

(56) References Cited

U.S. PATENT DOCUMENTS 6,179,706 B1 * 1/2001 Yoshinori ............ B60N 2/5657 297/180.14
6,481,801 B1 * 11/2002 Schmale .............. B60N 2/5635 297/180.14 X
7,108,319 B2 * 9/2006 Hartwich ............ B60N 2/5635 297/180.16

(Continued)

FOREIGN PATENT DOCUMENTS

JP 2007050134 A * 3/2007
JP 2020/090268 A 6/2020
JP 2025034283 A * 3/2025

*Primary Examiner* — Rodney B White

(74) *Attorney, Agent, or Firm* — Knobbe, Martens, Olson & Bear, LLP

(57) ABSTRACT

A vehicle seat includes a pad main body configuring part of seat cushion pad, a slide pad that configures another part of the seat cushion pad and that approaches or moves away from the pad main body by sliding in a seat front-rear direction, and a flow path that is formed at an opposite side of the pad main body to a seating surface thereof, and an air moving machine that moves air inside the flow path. The flow path reaches as far as an opposing face of the pad main body that opposes the slide pad, and a main body groove portion that is in communication with the flow path and that reaches as far as the seating surface is formed in the opposing face. The main body groove portion is formed narrower at a location on the seating surface side than at a location on the flow path side.

7 Claims, 7 Drawing Sheets

(56) References Cited

U.S. PATENT DOCUMENTS

| | | | | |
|---|---|---|---|---|
| 7,857,395 | B2 * | 12/2010 | Kikuchi | B60N 2/5657 297/180.14 X |
| 9,707,875 | B2 * | 7/2017 | Abe | B60N 2/58 |
| 10,124,705 | B2 * | 11/2018 | Abe | B60N 2/56 |
| 10,286,818 | B2 * | 5/2019 | Line | B60N 2/99 |
| 10,752,140 | B2 * | 8/2020 | Abe | B60N 2/70 |
| 11,135,949 | B2 * | 10/2021 | Okimura | A47C 7/74 |
| 11,325,509 | B2 * | 5/2022 | Panchani | B60N 2/0284 |
| 11,458,870 | B2 * | 10/2022 | Abe | B60N 2/56 |
| 11,571,998 | B2 * | 2/2023 | Binner | B60N 2/20 |
| 11,647,844 | B2 * | 5/2023 | Yonezawa | A47C 27/144 297/452.47 |
| 11,787,317 | B2 * | 10/2023 | Abe | B60N 2/5642 297/180.14 X |
| 11,850,982 | B2 * | 12/2023 | Okimura | A47C 27/15 |
| 12,377,764 | B2 * | 8/2025 | Palmer | B60N 2/5833 |
| 2024/0174144 | A1 * | 5/2024 | Nakazono | A47C 7/185 |
| 2024/0208383 | A1 * | 6/2024 | Wang | B60N 2/5825 |

* cited by examiner

UP
RH
FR
20
22
22A
(20A)
22B
24
24A
(20A)
26
28
30
32
34
35
36
40
(42)
44
46
50

VEHICLE SEAT

CROSS-REFERENCE TO RELATED APPLICATION

This application is based on and claims priority under 35 USC 119 from Japanese Patent Application No. 2023-140573 filed on Aug. 30, 2023, the disclosure of which is incorporated by reference herein.

BACKGROUND

The present disclosure relates to a vehicle seat.

RELATED ART

A transport seat with an air conditioner function is disclosed in Japanese Patent Application Laid-Open (JP-A) No. 2020-90268. A flow path is formed in a cushion pad of this transport seat on the opposite side of the cushion pad to a seating surface, and also plural through holes opening onto the seating surface are in communication with the flow path. Air is sucked in from the plural through holes when a suction device connected to the flow path is operated, in a configuration in which the thighs and buttocks of a seated person are cooled.

SUMMARY

However, in a vehicle seat having an adjustable front-rear direction length of a seat cushion, a slide pad (extension pad) configuring a front section of the seat cushion pad is slid in a seat front-rear direction so as to approach or move away from a pad main body of the seat cushion pad. In the vehicle seat provided with such a slide pad, the flow path for air conditioning is only formed at the pad main body, and so there is an issue that a flow of air onto the occupant is unable to be caused to be felt at the slide pad side.

In consideration of the above circumstances, an object of the present disclosure is to obtain a vehicle seat that is capable of causing a flow of air onto an occupant be felt even at a slide pad side.

A vehicle seat of a first aspect of the present disclosure includes a pad main body configuring part of a pad that supports an occupant with a seating surface, a slide pad that configures another part of the pad, and that approaches or moves away from the pad main body by sliding in a direction oriented along the seating surface, a cover main body that has breathable properties and that covers the pad main body, a slide cover that covers the slide pad, a flow path that is formed at an opposite side of the pad main body from the seating surface, and an air moving machine that moves air inside the flow path. The flow path reaches as far as an opposing face of the pad main body that opposes the slide pad. A main body groove portion that is in communication with the flow path and that reaches as far as the seating surface is formed in the opposing face. The main body groove portion is formed narrower at a location on the seating surface side than at a location on a flow path side.

In the vehicle seat of the first aspect, the occupant is supported by the seating surface of the pad. Part of the pad is configured by the pad main body, and another part of the pad is configured by the slide pad. The pad main body is covered by the cover main body having breathable properties, and the slide pad is covered by the slide cover. The slide pad approaches or moves away from the pad main body by sliding in a direction oriented along the seating surface.

The flow path is formed at the pad main body at the opposite side to the seating surface, and air inside the flow path is moved by the air moving machine. The flow path reaches as far as the opposing face of the pad main body that opposes the slide pad, and the main body groove portion that communicates with the flow path and that reaches as far as the seating surface is formed in the opposing face. This thereby enables a flow of air onto the occupant to be caused to be felt even on the slide pad side by operating the air moving machine, due to the occupant side space and the flow path being in communication via the main body groove portion even in a state in which the slide pad is in close proximity to the pad main body and the gap between the pad main body and the slide pad has been narrowed. Moreover, the main body groove portion is formed narrower at a location on the seating surface side than at a location on the flow path side, and so this enables a configuration in which the cover main body covering the pad main body does not sag into the place of the main body groove portion, thereby enabling a detrimental effect to the external appearance of the vehicle seat to be avoided.

A vehicle seat of a second aspect is the first aspect, wherein the main body groove portion is configured by a single fat groove at a location on the flow path side and is configured by plural fine grooves at a location on the seating surface side.

In the vehicle seat of the second aspect, the main body groove portion formed at the opposing face of the pad main body that opposes the slide pad is configured by the single fat groove at the location on the flow path side and is configured by plural fine grooves at the location on the seating surface side. This thereby enables the main body groove portion to secure a volume of airflow, while avoiding a detrimental effect to the external appearance of the vehicle seat.

A vehicle seat of a third aspect is the first aspect or the second aspect, wherein the slide cover has breathable properties, and a slide groove portion is formed at an opposing face of the slide pad that opposes the pad main body at a place opposing the main body groove portion in a slide direction of the slide pad.

In the vehicle seat of the third aspect, the occupant side space is in communication with the flow path via the slide groove portion and via the main body groove portion even in a state in which the slide pad is in close proximity to the pad main body and the gap between the pad main body and the slide pad has been narrowed. This thereby enables a good flow of air onto the occupant to be caused to be felt.

A vehicle seat of a fourth aspect is the third aspect, wherein a surface groove portion that communicates with the slide groove portion is formed at a surface of the slide pad configuring part of the seating surface.

In the vehicle seat of the fourth aspect, the surface groove portion formed at the surface of the slide pad configuring part of the seating surface is in communication with the flow path via the slide groove portion and via the main body groove portion even in a state in which the slide pad is in close proximity to the pad main body and the gap between the pad main body and the slide pad has been narrowed. This thereby enables a flow of air to be caused to be felt on the body of the occupant at places supported by the surface of the slide pad.

A vehicle seat of a fifth aspect is the third aspect, wherein part of the slide groove portion opposes a location at the flow path side of the main body groove portion along the slide direction.

In the vehicle seat of the fifth aspect, part of the slide groove portion formed in the opposing face of the slide pad that opposes the pad main body opposes the location at the flow path side of the main body groove portion formed at the opposing face of the main body pad that opposes the slide pad (namely, at a location of the main body groove portion that is fatter than the location at the seating surface side thereof) along the slide direction of the slide pad. A flow of air between the slide groove portion and the main body groove portion is accordingly easily secured even in cases in which there is some variation in the positions of the slide groove portion and the main body groove portion.

A vehicle seat of a sixth aspect is any one of the first aspect to the fifth aspect, wherein the pad is a seat cushion pad provided at a seat cushion for supporting buttocks and thighs of a seated occupant, and the slide pad is disposed at a seat front side with respect to the pad main body, and slides along a seat front-rear direction with respect to the pad main body.

In the vehicle seat of the sixth aspect, the buttocks and thighs of the occupant seated on the seat cushion are supported by the seating surface of the seat cushion pad. The slide pad of the seat cushion pad is disposed at the seat front side with respect to the pad main body of the seat cushion pad, and is slid along the seat front-rear direction with respect to the pad main body. This thereby enables the front-rear direction length of the seat cushion to be adjusted according to occupant build or the like.

As described above, the vehicle seat according to the present disclosure enables a flow of air onto an occupant to be caused to be felt even on a slide pad side.

BRIEF DESCRIPTION OF THE DRAWINGS

Exemplary embodiments of the present invention will be described in detail based on the following figures, wherein.

DETAILED DESCRIPTION

Figure 1:
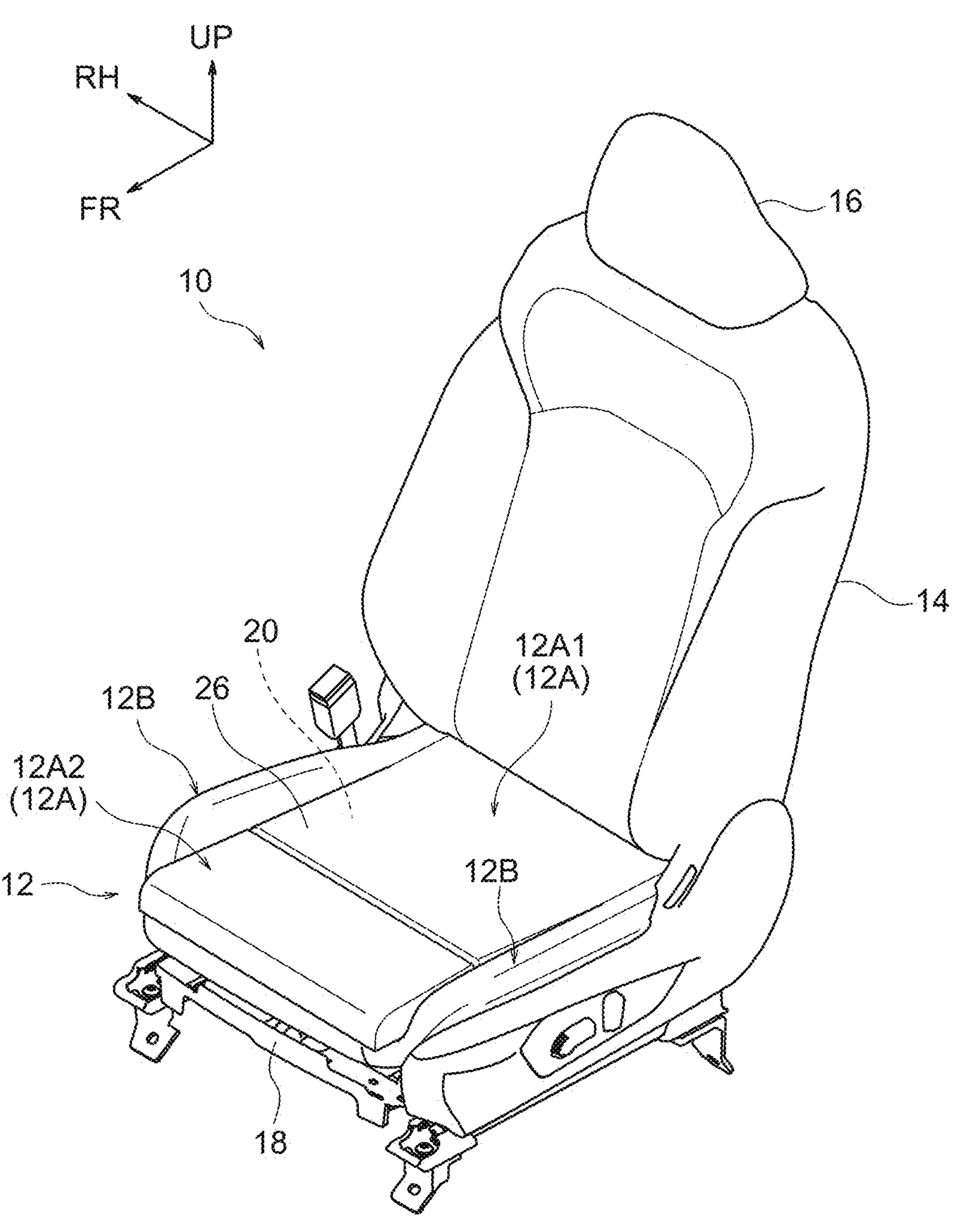
FIG. 1 is a perspective view illustrating a vehicle seat according to an exemplary embodiment.

Description follows regarding a vehicle seat 10 according to an exemplary embodiment of the present disclosure, with reference to FIG. 1 to FIG. 7. Note that sometimes reference numerals of some portions are omitted in the drawings in order to facilitate looking at the drawings. Note that as appropriate in the drawings, arrows FR, RH, UP respectively indicate forward, rightward, and upward directions of the vehicle seat 10. When in the following reference is simply made to front and rear, left and right, and up and down directions, then these indicate directions with respect to the vehicle seat 10.

As illustrated in FIG. 1, the vehicle seat 10 according to the present exemplary embodiment includes a seat cushion 12 that supports the buttocks and thighs of an occupant, a seatback 14 that supports the back of the occupant, and a headrest 16 that supports the head of the occupant. The seat cushion 12 includes a seat cushion frame 18 that is a framework member, a seat cushion pad (pad) 20 that is a pad member, and a seat cushion cover 26 that is a cover covering the seat cushion pad 20.

The seat cushion frame 18 is, for example, configured from metal. The seat cushion pad 20 is, for example, configured from a foam body, such as urethane foam or the like, and covers the seat cushion frame 18 from an upper side thereof. The seat cushion cover 26 is, for example, formed in a bag shape by sewing plural pieces of cover made from a cloth material, leather, synthetic leather, or the like together, and covers the seat cushion pad 20 from an upper side thereof.

Figure 2:
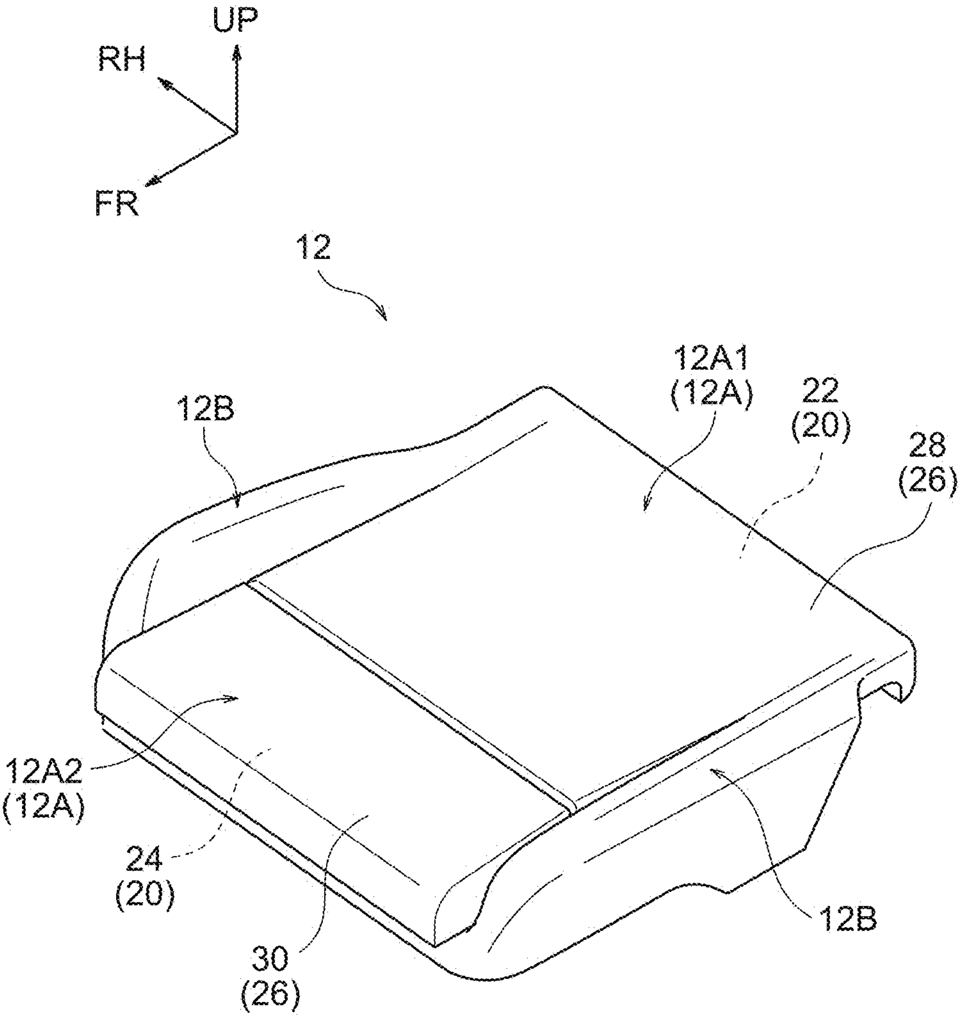
FIG. 2 is a perspective view illustrating a seat cushion of a vehicle seat according to an exemplary embodiment.

As illustrated in FIG. 2, a left-right direction central section of the seat cushion 12 configures a main section 12A that supports the buttocks and thighs of the occupant from a lower side thereof, and the two left-right direction side portions of the seat cushion 12 configure a left-right pair of side portions 12B that supports the buttocks and thighs of the occupant from the sides thereof. In the seat cushion 12, a front portion of the main section 12A configures a slide portion 12A2, and portions thereof other than the slide portion 12A2 configure a cushion main body 12A1.

The seat cushion pad 20 is divided into a pad main body 22 that configures a pad member of the cushion main body 12A1, and a slide pad (extension pad) 24 that configures a pad member of the slide portion 12A2. The pad main body 22 configures part of the seat cushion pad 20, and the slide pad 24 configures other parts of the seat cushion pad 20. An upper face 22A of the pad main body 22 and an upper face 24A of the slide pad 24 configure a seating surface 20A that supports the buttocks and thighs of the occupant.

The slide pad 24 is disposed at the front side with respect to the pad main body 22, and is supported from below by a non-illustrated cushion-length varying mechanism. The cushion-length varying mechanism is configured so as to cause the slide pad 24 to approach or move away from pad main body 22 by being slid in a front-rear direction by drive force such as a motor.

The seat cushion cover 26 is divided into a cover main body 28 that covers the pad main body 22, and a slide cover 30 that covers the slide pad 24. The cover main body 28 and the slide cover 30 both have breathable properties. Namely, the plural pieces of cover configuring the cover main body 28 and the slide cover 30 serve as main parts configured from a cloth material having breathable properties, or from leather, synthetic leather, or the like formed with multiple vent holes. Note that the cover main body 28 and the slide cover 30 may be configured by a thin urethane film having breathable properties being laminated to a back face of each of the cover pieces described above.

A cloth shaped insert sheet 32 is stuck to a lower face 20B on the opposite side of the pad main body 22 from the seating surface 20A. The insert sheet 32 is, for example, formed by being integrally foam molded together with the pad main body 22. A seal member 34 is installed to a bottom side of the pad main body 22. The seal member 34 is, for example, configured with a rectangular plate shape from a non-metal, such as a non-woven fabric, press felt, or the like. An air moving machine 36 is disposed at a lower side of a rear portion of the seal member 34, with a through hole 35 formed in a rear portion of the seal member 34 in communication with a suction port of the air moving machine 36.

Figure 3:
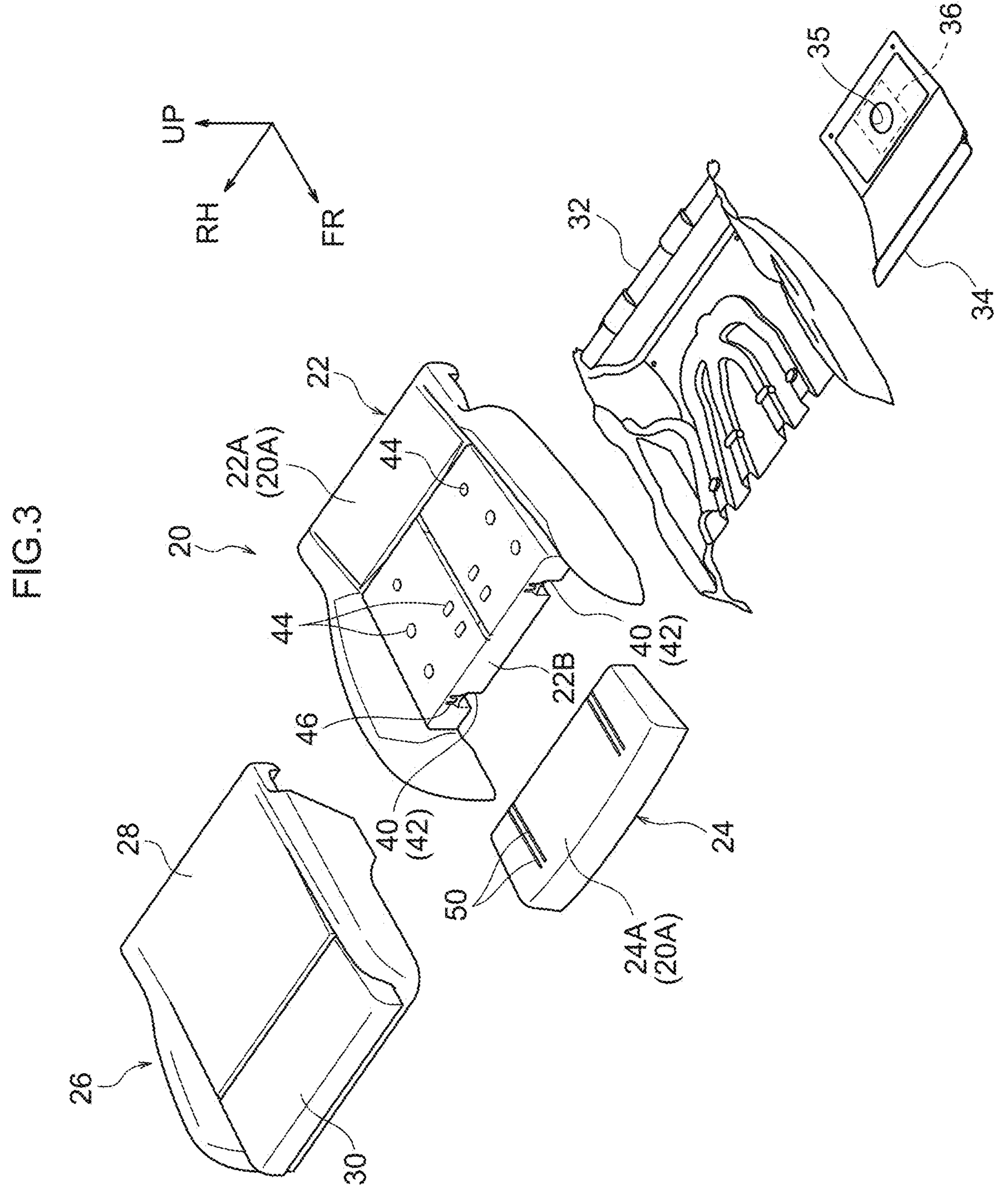
FIG. 3 is an exploded perspective view illustrating a configuration of part of a seat cushion.
Figure 4:
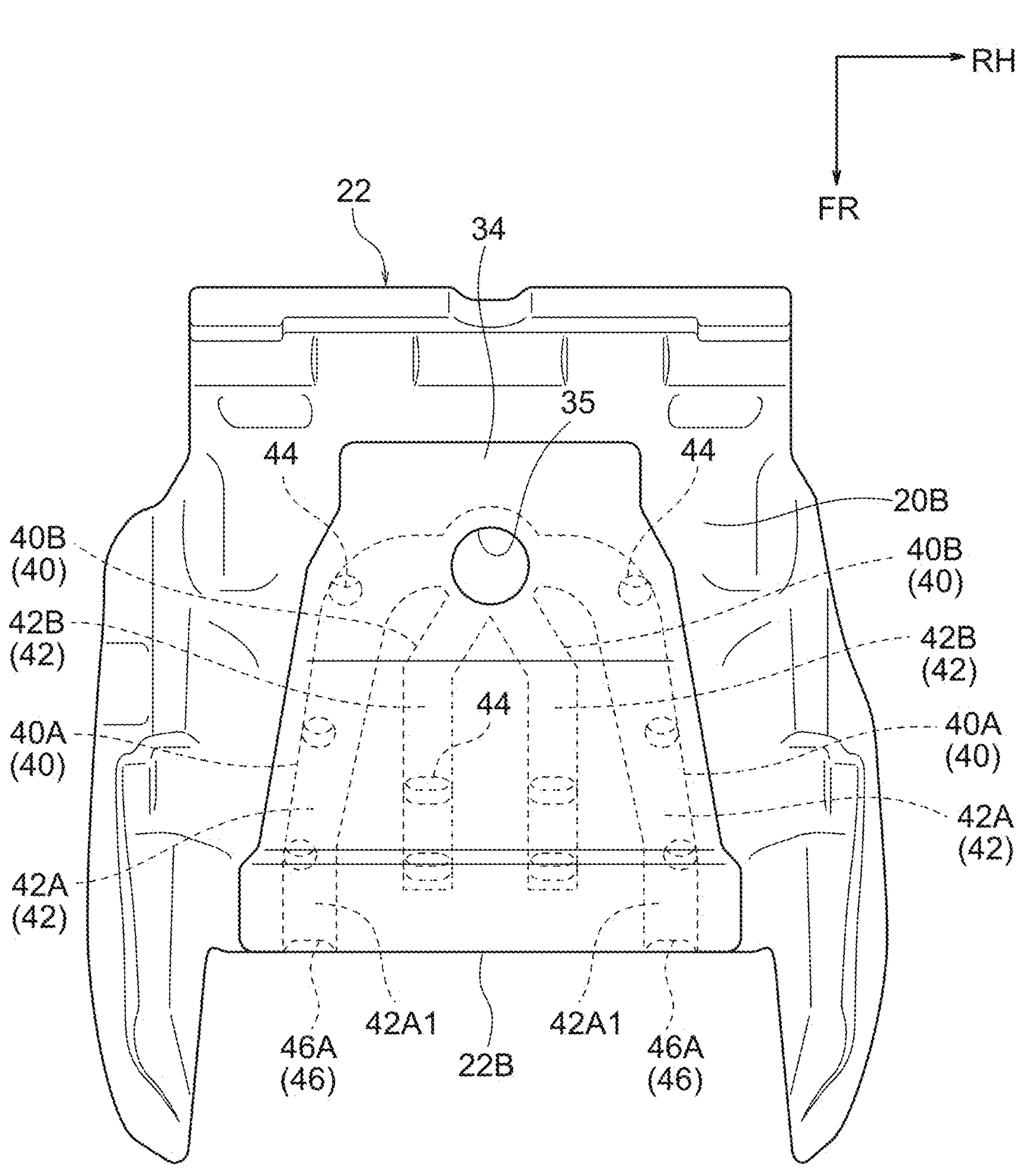
FIG. 4 is a bottom view illustrating a pad main body of a seat cushion pad.

As illustrated in FIG. 3 and FIG. 4, plural (in this case four) indentations 40 that are indented toward the upper face 22A side of the pad main body 22 are formed in the lower face 20B of the pad main body 22 so as to each run along the front-rear direction. The four indentations 40 are formed in the lower face of the pad main body 22 at a location configuring the main section 12A, and are arranged in a row along the left-right direction. The four indentations 40 extend from a rear portion of the pad main body 22 to a front portion side of the pad main body 22.

Rear ends of the four indentations 40 merge flow above the through hole 35 of the seal member 34. Front ends of two indentations 40A at both left-right direction outsides from out of the four indentations 40 reach as far as a lower portion of an opposing face 22B of the pad main body 22 that opposes the slide pad 24. The front ends of two indentations 40B at the left-right direction center side from out of the four indentations 40 are disposed further to a rear side than the opposing face 22B.

The insert sheet 32 stuck to the lower face 20B of the pad main body 22 is molded so as to follow the profile of the four indentations 40, and the four indentations 40 are reinforced by the insert sheet 32. The seal member 34 disposed at the lower side of the pad main body 22 contacts the lower face of the pad main body 22 with the insert sheet 32 interposed therebetween, and the four indentations 40 are closed off by the seal member 34. This results in four flow paths 42 having closed cross-section structures being formed at a lower portion of the pad main body 22.

Plural through holes 44 are formed piercing through the pad main body 22 in an up-down direction at a location of the pad main body 22 configuring the main section 12A. Upper ends of the plural through holes 44 open onto the upper face (the seating surface 20A) of the pad main body 22, and the lower ends of the plural through holes 44 are each in communication with one or other of the four flow paths 42. The two flow paths 42A at the both left-right direction outsides from out of the four flow paths 42 reach to a lower portion of the opposing face 22B of the pad main body 22 that opposes the slide pad 24. The front ends of the two flow paths 42A at both left-right direction outsides are configured as vent holes 42A1.

The air moving machine 36 disposed at the lower side of the seal member 34 is, as an example, a suction fan that sucks in air from inside the four flow paths 42, and blows the air toward the lower side of the seat cushion 12. This leads to a negative pressure inside the four flow paths 42. As a result thereof, air on the occupant side is drawn into the four flow paths 42 via the vent holes 42A1 of the two flow paths 42A at the left-right direction outside and via the plural through holes 44. The air drawn into the four flow paths 42 is, after moving through inside the four flow paths 42, exhausted to the lower side of the seat cushion 12 by the air moving machine 36.

Note that in cases in which the air moving machine 36 is configured to blow air toward the inside of the four flow paths 42, this results in a configuration in which the air at the lower side of the seat cushion 12 is drawn into the four flow paths 42 and is exhausted to the occupant side via the vent holes 42A1 of the two flow paths 42A on the left-right direction outside and via the plural through holes 44.

Figure 5:
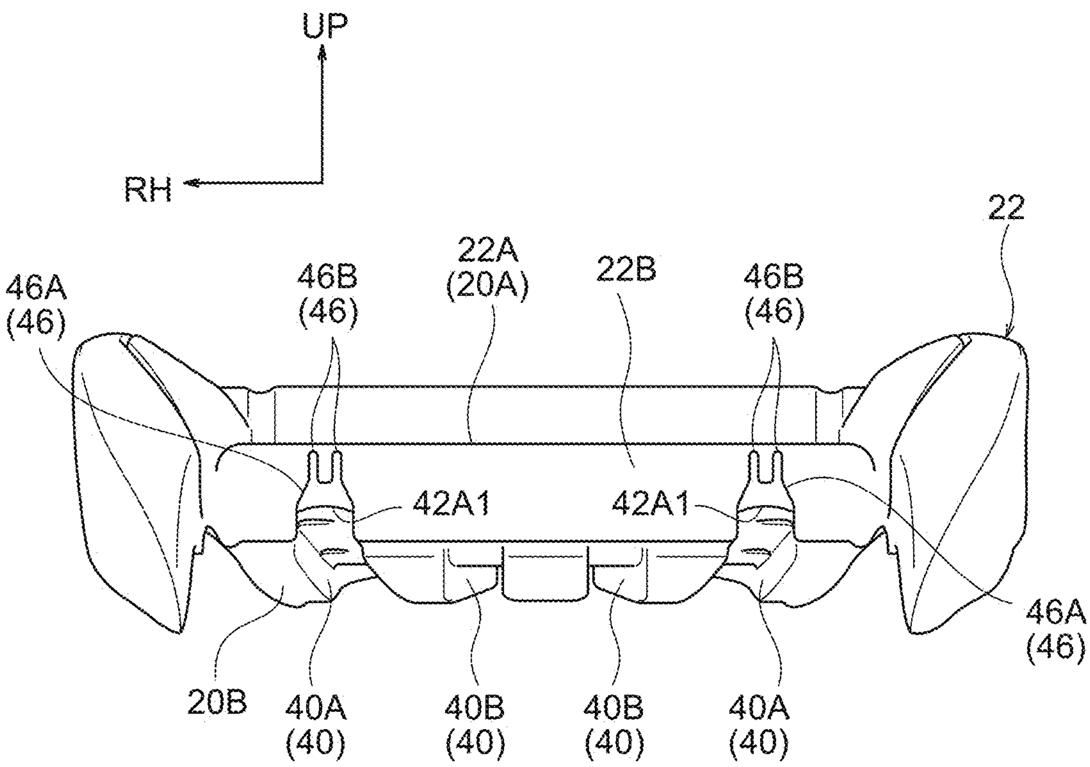
FIG. 5 is a front view illustrating a pad main body.

As illustrated in FIG. 5, a left-right pair of main body groove portions 46 that communicate with the vent holes 42A1 of the two left-right direction outside flow paths 42A and reach as far as the seating surface 20A is formed at the opposing face 22B of the pad main body 22 that opposes the slide pad 24. The left side main body groove portion 46 is formed at a left end portion of the opposing face 22B, and the right side main body groove portion 46 is formed at a right end portion of the opposing face 22B. The two main body groove portions 46 are indented toward the rear side and extend along the up-down direction. These main body groove portions 46 are formed with locations on the seating surface 20A side (upper side) thereof narrower than locations on the flow path 42A side (lower side) thereof. More specifically, each of the main body groove portions 46 is configured by a single fat groove 46A at a location on the lower side, and with plural (in this case two) fine grooves 46B configured at locations on the upper side.

The two fine grooves 46B are disposed side-by-side along the left-right direction at a narrower spacing than a left-right direction width dimension of the front ends of the flow paths 42A, and extend along the up-down direction. The single fat grooves 46A are each set with a left-right direction width dimension at a lower end thereof that is equivalent to the left-right direction width dimension at the front end of the flow path 42A, are each set with a left-right direction width dimension at an upper end thereof that is equivalent to the spacing between two of the fine grooves 46B, and is configured with a substantially trapezoidal profile when viewed from the front side. The left-right direction width dimension of each of the fine grooves 46B is set sufficiently smaller than the left-right direction width dimension of the fat groove 46A and, for example is set to 3 millimeters or greater.

Figure 6:
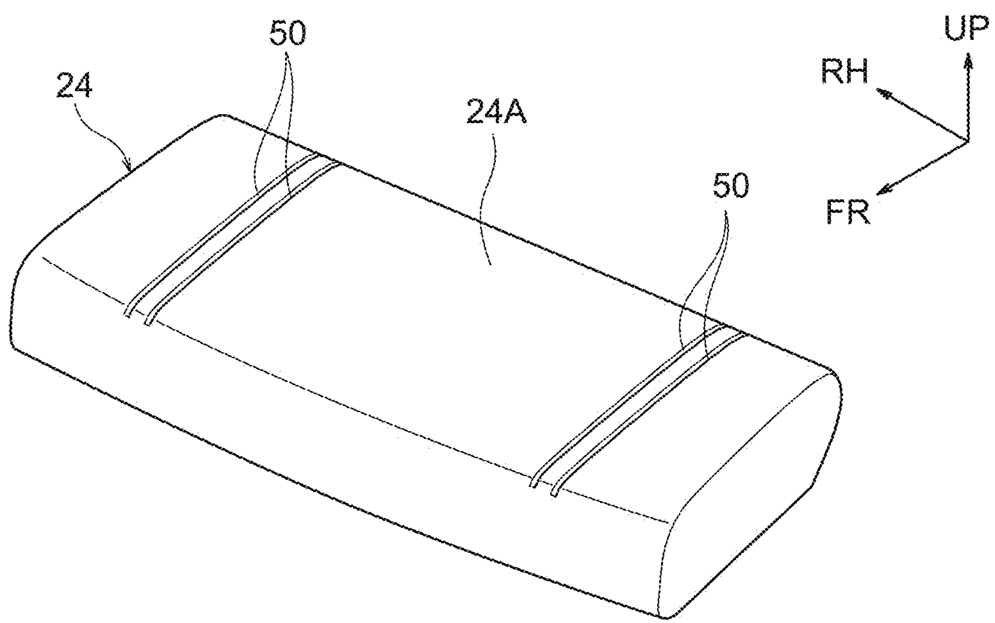
FIG. 6 is a perspective view illustrating a slide pad of a seat cushion pad.
Figure 7:
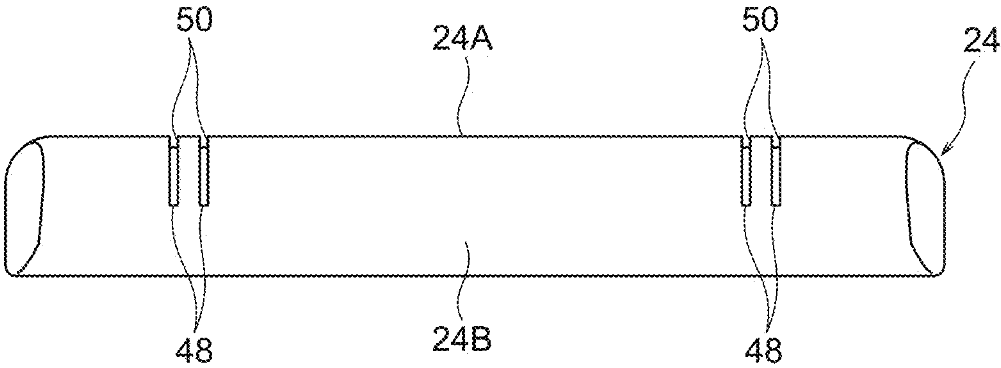
FIG. 7 is a back view illustrating a slide pad.

As illustrated in FIG. 6 and FIG. 7, plural (in this case four) slide groove portions 48 and plural (in this case four) surface groove portions 50 are formed at the slide pad 24. The four slide groove portions 48 are formed at the opposing face 24B of the slide pad 24 that opposes the pad main body 22, extend in the up-down direction, and are indented toward the front side. Two from out of the four slide groove portions 48 are formed so as to be in mutual close proximity at a left end portion of the opposing face 24B, and the remaining two from out of the four slide groove portions 48 are formed so as to be in mutual close proximity at a right end portion of the opposing face 24B. A left-right direction groove width of each of the slide groove portions 48 is set equivalent to the left-right direction groove width of the fine grooves 46B.

The two left side slide groove portions 48 are formed at places opposing the left side main body groove portion 46 along the slide direction (front-rear direction) of the slide pad 24, and the right side two slide groove portions 48 are formed at places opposing the right side main body groove portion 46 along the slide direction of the slide pad 24. More precisely, the two left side slide groove portions 48 are disposed at left-right direction positions aligned with respect to the two fine grooves 46B provided at the left side main body groove portion 46, and the two right side slide groove portions 48 are disposed at left-right direction positions aligned with respect to the two fine grooves 46B provided at the right side main body groove portion 46.

Four surface groove portions 50 are formed at an upper face (surface) 24A configuring part of the seating surface 20A of the slide pad 24, extend along the front-rear direction, and are indented toward a lower side. Two out of the four surface groove portions 50 are formed in mutual close proximity at a left end portion of the upper face 22A, and the remaining two from out of the four surface groove portions 50 are formed in mutual close proximity at a right end portion of the upper face 22A. The left-right direction groove width of each of the surface groove portions 50 is set to be equivalent to the left-right direction groove width of each of the slide groove portions 48.

The two left side surface groove portions 50 are disposed at left-right direction positions aligned with respect to the two left side slide groove portions 48, and the two right side surface groove portions 50 are disposed at left-right direction positions aligned with respect to the right side two slide groove portions 48. Respective rear ends of the two left side surface groove portions 50 are in communication with upper ends of the two left side slide groove portions 48, and respective rear ends of the two right side surface groove portions 50 are in communication with upper ends of the two right side slide groove portions 48.

In a state in which the slide pad 24 has approached closest to the pad main body 22, the pad main body 22 and the slide pad 24 are in contact with each other with the cover main body 28 and the slide cover 30 interposed therebetween, and a gap between the pad main body 22 and the slide pad 24 is narrowed. In this state the two fine grooves 46B of the left side main body groove portion 46 and the two left side slide groove portions 48 are in communication with each other through the cover main body 28 and the slide cover 30 that have breathable properties, and also the two fine grooves 46B of the right side main body groove portion 46 and the two right side slide groove portions 48 are in communication with each other through the cover main body 28 and the slide cover 30 that have breathable properties.

Lower portions (parts) of the two left side slide groove portions 48 are disposed at the same height as the fat groove 46A of the left side main body groove portion 46, and oppose the fat groove 46A of the left side main body groove portion 46 along the front-rear direction. Similarly, lower portions (parts) of the two right side slide groove portions 48 are disposed at the same height as the fat groove 46A of the right side main body groove portion 46, and oppose the fat groove 46A of the right side main body groove portion 46 along the front-rear direction.

Next, description follows regarding the operation and advantageous effects of the present exemplary embodiment.

In the vehicle seat 10 configured as described above, the buttocks and thighs of an occupant seated in the seat cushion 12 are supported by the seating surface 20A of the seat cushion pad. The slide pad 24 of the seat cushion pad 20 is disposed at the front side with respect to the pad main body 22 of the seat cushion pad 20. The pad main body 22 is covered by the cover main body 28 having breathable properties, and the slide pad 24 is covered by the slide cover 30 having breathable properties. The slide pad 24 approaches or moves away from the pad main body 22 by sliding in the front-rear direction along the seating surface 20A. This thereby enables the front-rear direction length of the seat cushion 12 to be adjusted according to occupant build or the like.

The four flow paths 42 are formed at the pad main body 22 on the opposite side to the seating surface 20A, and air inside each of the flow paths 42 is moved by the air moving machine 36. The plural through holes 44 opening onto the upper face 22A of the pad main body 22 are in communication with the four flow paths 42, and so the occupant side air is drawn into the four flow paths 42, and is exhausted to the lower side of the seat cushion 12. This enables a flow of air to be felt at places supported by the pad main body 22, i.e. by the buttocks and thighs of the occupant, thereby improving occupant comfort.

Moreover, the front ends of the two flow path 42A at the left-right direction outsides of the four flow paths 42 are configured by the vent holes 42A1 that reach the opposing face 22B of the pad main body 22 that opposes the slide pad 24. In a state in which the slide pad 24 has separated from the pad main body 22, the gap formed between the slide pad 24 and the pad main body 22 is widened, and communicates with these two flow paths 42A. Occupant side air is sucked into these two flow paths 42A through this gap by operating the air moving machine 36 in this state, and is exhausted to the lower side of the seat cushion 12. This thereby enables a flow of air onto an occupant be caused to be felt even at a slide pad 24 side.

Furthermore, in the present exemplary embodiment, the left-right pair of main body groove portions 46 that are in communication with the vent holes 42A1 of the two aforementioned flow paths 42A and that reach to the seating surface 20A are formed at the opposing face 22B of the pad main body 22 that opposes the slide pad 24. This thereby enables a flow of air onto the occupant to be caused to be felt even on the slide pad 24 side by operating the air moving machine 36, due to the occupant side space being in communication with the two flow paths 42A via the two main body groove portions 46 even in a state in which the slide pad 24 is in close proximity to the pad main body 22 and the gap between the pad main body 22 and the slide pad 24 has been narrowed.

Moreover, each of the two main body groove portions 46 is formed narrower at locations on the seating surface 20A side thereof than at locations on the flow path 42A side thereof, and so this enables a configuration in which the cover main body 28 covering the pad main body 22 does not sag into places of the main body groove portions 46, thereby enabling a detrimental effect to the external appearance of the vehicle seat 10 to be avoided.

Moreover, the main body groove portions 46 are each configured with the one fat groove 46A at the location on the flow path 42A side, and are each configured with the two fine grooves 46B at the location on the seating surface 20A side. This thereby enables the main body groove portions 46 to secure a volume of airflow, while avoiding a detrimental effect to the external appearance of the vehicle seat 10.

Furthermore, in the present exemplary embodiment the slide groove portions 48 are formed at the opposing face 24B of the slide pad 24 that opposes the pad main body 22 at places opposing the main body groove portion 46 in the slide direction (front-rear direction) of the slide pad 24. The occupant side space is in communication with the flow paths 42A via the slide groove portions 48 and the main body groove portion 46 even in a state in which the slide pad 24 is in close proximity to the pad main body 22 and the gap between the pad main body 22 and the slide pad 24 has been narrowed. This thereby enables a good flow of air onto the occupant to be caused to be felt.

Moreover, in the present exemplary embodiment the surface groove portions 50 that are in communication with the slide groove portions 48 are formed at the upper face 24A configuring part of the seating surface 20A of the slide pad 24. This means that even in a state in which the slide pad 24 is in close proximity to the pad main body 22, and the gap between the pad main body 22 and the slide pad 24 has been narrowed, the surface groove portions 50 formed at the upper face 24A of the slide pad 24 are in communication with the flow paths 42A via the slide groove portions 48 and via the main body groove portions 46. This thereby enables a flow of air to be caused to be felt at places supported by the upper face 24A of the slide pad 24, i.e. the thighs of the occupant.

Moreover, in the present exemplary embodiment lower portions of the slide groove portions 48 formed at the opposing face 24B of the slide pad 24 that opposes the pad main body 22 oppose the fat grooves 46A that are at locations on the flow path 42A side of the main body groove portions 46 along the slide direction (front-rear direction) of the slide pad 24. This thereby enables a flow of air between the slide groove portions 48 and the main body groove portions 46 to be secured easily even in cases in which there is some variation in the left-right direction positions of the slide groove portions 48 and the main body groove portions 46.

Note that although explanation of the above exemplary embodiment is of a case in which the seat cushion pad 20 serves as the pad of the present disclosure, a pad of the seatback 14 may serve as the pad of the present disclosure.

In addition various modifications may be implemented within a range not departing from the spirit of the present disclosure. Moreover, obviously the scope of rights of the present disclosure is not limited by the above exemplary embodiment.

What is claimed is:

1. A vehicle seat, comprising:

a pad main body configuring part of a pad that supports an occupant with a seating surface;

a slide pad that configures another part of the pad, and that is configured to approach or move away from the pad main body by sliding in a direction oriented along the seating surface;

a cover main body that has breathable properties and that covers the pad main body;

a slide cover that covers the slide pad;

a flow path that is formed at an opposite side of the pad main body from the seating surface; and an air moving machine configured to move air inside the flow path, wherein:

the flow path is configured to reach as far as an opposing face of the pad main body that opposes the slide pad, a main body groove portion is formed at the opposing face of the pad main body, is in communication with the flow path, and is configured to reach as far as the seating surface is formed in the opposing face, and the main body groove portion is formed narrower at a location on a seating surface side than at a location on a flow path side, and the slide pad is disposed at a front side of the vehicle seat with respect to the pad main body, and the opposing face of the pad main body in which the main body groove portion is formed faces the front side of the vehicle seat.

2. The vehicle seat of claim 1, wherein the main body groove portion is configured by a single fat groove at a location on the flow path side and is configured by a plurality of fine grooves at a location on the seating surface side.

3. The vehicle seat of claim 1, wherein:

the slide cover has breathable properties; and a slide groove portion is formed at an opposing face of the slide pad that opposes the pad main body at a place opposing the main body groove portion in a slide direction of the slide pad.

4. The vehicle seat of claim 3, wherein a surface groove portion that communicates with the slide groove portion is formed at a surface of the slide pad configuring part of the seating surface.

5. The vehicle seat of claim 3, wherein part of the slide groove portion opposes a location at the flow path side of the main body groove portion along the slide direction.

6. The vehicle seat of claim 1, wherein:

the pad is a seat cushion pad provided at a seat cushion for supporting buttocks and thighs of a seated occupant; and the slide pad is disposed at a seat front side with respect to the pad main body, and slides along a seat front-rear direction with respect to the pad main body.

7. A vehicle seat, comprising:

a pad main body configuring part of a pad that supports an occupant with a seating surface;

a slide pad that configures another part of the pad, and is configured to approach or move away from the pad main body by sliding in a direction oriented along the seating surface;

a cover main body that has breathable properties and that covers the pad main body;

a slide cover that covers the slide pad;

a flow path that is formed at an opposite side of the pad main body from the seating surface; and an air moving machine configured to move air inside the flow path, wherein:

the flow path is configured to reach as far as an opposing face of the pad main body that opposes the slide pad, a main body groove portion is formed at the opposing face of the pad main body, is in communication with the flow path, and is configured to reach as far as the seating surface is formed in the opposing face, the main body groove portion is formed narrower at a location on a seating surface side than at a location on a flow path side, the slide cover has breathable properties, and a slide groove portion is formed at an opposing face of the slide pad that opposes the pad main body at a place opposing the main body groove portion in a slide direction of the slide pad.

* * * * *